United States Patent [19]

Correa et al.

[11] Patent Number: 5,329,314
[45] Date of Patent: Jul. 12, 1994

[54] METHOD AND APPARATUS FOR VIDEO SIGNAL INTERPOLATION AND PROGRESSIVE SCAN CONVERSION

[75] Inventors: Carlos Correa, VS-Schwenningen; John Stolte, VS-Tannheim, both of Fed. Rep. of Germany

[73] Assignee: Deutsche Thomson-Brandt GmbH, Villingen-Schwenningen, Fed. Rep. of Germany

[21] Appl. No.: 45,485

[22] Filed: Apr. 9, 1993

[30] Foreign Application Priority Data

Apr. 9, 1992 [DE] Fed. Rep. of Germany ....... 4211955

[51] Int. Cl.$^5$ .............................................. H04N 7/01
[52] U.S. Cl. ..................................... 348/448; 348/443
[58] Field of Search ................... 358/11, 140, 141, 12; H04N 7/07, 5/21, 5/14

[56] References Cited

U.S. PATENT DOCUMENTS

| | | | |
|---|---|---|---|
| 4,896,212 | 1/1990 | Chantelou | 358/140 |
| 4,989,090 | 1/1991 | Campbell et al. | 358/140 |
| 5,001,563 | 3/1991 | Doyle et al. | 358/140 |
| 5,081,532 | 1/1992 | Rabii | 358/105 |
| 5,168,358 | 12/1992 | Ishizu et al. | 358/140 |

FOREIGN PATENT DOCUMENTS

| | | |
|---|---|---|
| 152738 | 8/1985 | European Pat. Off. |
| 3608917 | 9/1987 | Fed. Rep. of Germany. |
| 3114275 | 7/1989 | Fed. Rep. of Germany. |
| 2231460 | 11/1990 | United Kingdom. |

OTHER PUBLICATIONS

Achiha, M: Bewegungsadaptiver Qualitatsdecoder und Up-Konverter fur PAL-Signale; pub. Fernseh- und Kino-Technik; 1992; pp. 98-104.

Hentschel: "Comparison Between Median Filtering and Vertical Edge Controlled Interpolation for Flicker Reduction"; IEEE Transactions on Consumer Electronics, vol. 35; Aug. 1989; pp. 279-289.

Also enclosed herewith, for the examiner's information, is a copy of a search report prepared by the German patent office.

*Primary Examiner*—James J. Groody
*Assistant Examiner*—Glenton B. Burgess
*Attorney, Agent, or Firm*—Joseph S. Tripoli; Peter M. Emanuel; Richard G. Coalter

[57] ABSTRACT

A video input signal is vertically interpolated and applied along with a field delayed and a field advanced video signal to respective inputs of a first median filter the output of which is applied along with a line delayed and a line advanced signal to respective inputs of a second median filter to provide an interpolated video output signal. The resultant double median filtered signal and a field delayed signal are applied via respective time compressors to a multiplex switch to provide an output signal of progressive scan form and in which every other line thereof is interpolated by double median filtering.

12 Claims, 3 Drawing Sheets

METHOD AND APPARATUS FOR VIDEO SIGNAL INTERPOLATION AND PROGRESSIVE SCAN CONVERSION

FIELD OF THE INVENTION

This invention relates generally to television systems and particularly to methods and apparatus for video signal interpolation and for conversion of video signals from an interlaced form to a non-interlaced or "progressive scan" form.

BRIEF DESCRIPTION OF THE PRIOR ART

In image processing, there are various methods for converting video signals from interlaced to progressive scan form. Typically, these employ some form of spatial and/or temporal interpolation to obtain "extra" lines for display from the incoming video signal. For example, there are television receivers which double the lines in one field by either repeating lines or obtaining the extra lines needed by means of vertical (spatial) interpolation. Such forms of conversion are commonly called intra-field progressive scan conversion systems since the "extra" lines for display are obtained by interpolation from lines of the same field.

Other forms of conversion are known which involve both spatial and temporal interpolation. In such systems lines from temporally associated fields are used in forming a progressive scan signal in cases where the image has no motion (a static image). A motion detector determines the presence or absence of motion and, for the case where motion exists, the extra lines for display are obtained by vertical interpolation. Progressive scan converters of this type is generally known as motion adaptive or motion "compensated" converters since the decision to use temporal or spatial interpolation is determined by the motion detector.

In the first case (intra-field conversion), the hardware complexity is relatively low but the resultant image quality is not optimum with certain image contents. In the second case, (motion adaptive conversion) the image quality is higher but the hardware complexity is also higher. A further problem with conventional motion adaptive systems is that errors in the detection of motion can produce visible artifacts when switching between field and frame processing.

SUMMARY OF THE INVENTION

The present invention is directed to meeting the need for a method and apparatus for providing progressive-interlace conversion in which good image quality is provided with relatively low hardware complexity.

In accordance with the invention, a median filter is used for carrying out for each pixel to be determined a temporal interpolation of two temporally adjacent pixels of the same spatial position. The result is corrected by means of a further median filtering of the vertically adjacent pixels. For this double median (hereafter, "DM") interpolation it is of advantage that no motion detection is required. In addition, the DM interpolation is relatively insensitive to noise.

A method for interpolating a video input signal, in accordance with the invention, comprises forming a vertically interpolated signal from the video input signal; forming a first median filtered signal by applying the vertically interpolated signal, a field delayed signal and a field advanced signal to respective inputs of a first median filter; and forming a video output signal subjected to double median filtering by applying said first median filtered signal, a line delayed signal and a line advanced signal to respective inputs of a second median filter.

In an exemplary embodiment of the invention, apparatus is provided having an input from which interlace pixels are supplied to a first field buffer and to a first median filter, which also receives the output signal of a second field buffer and the output signal of an averaging circuit, the output signal of the first field buffer being supplied to a line buffer, to the first input of the averaging circuit and to a second median filter, and the output signal of the line buffer passing to the input of the second field buffer, to a second input of the averaging circuit and to a second median filter which is also fed with the output signal of the first median filter, the values for the pixels of the progressive output signal being taken at the output of the second median filter.

BRIEF DESCRIPTION OF THE DRAWING

The foregoing and further features of the invention are illustrated in the accompanying drawing, wherein.

DETAILED DESCRIPTION

Figure 1:
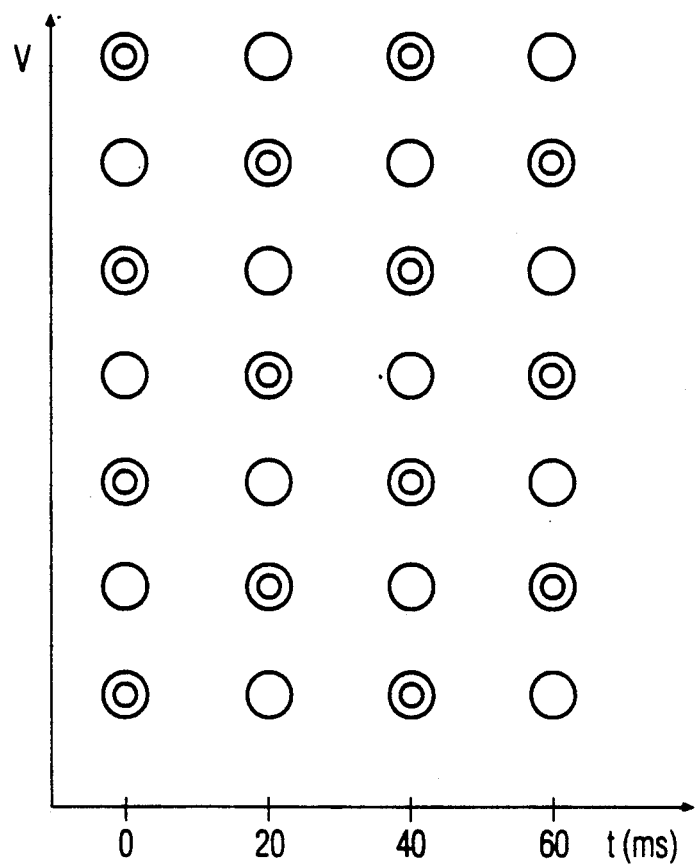
FIG. 1 illustrates a vertical-temporal scanning diagram.

FIG. 1 shows scanned pixels in the vertical-temporal (v, t) plane. The small circles mark the pixels of the interlace input signal, for example 625/50/2:1 (i.e., 625 lines per frame, 50 fields per second, two to one line interlace). The large circles mark the pixels of the progressive output signal, for example 625/50/1:1. A first field belongs to time t=0 ms and a second field belongs to time t=20 ms.

Figure 2:
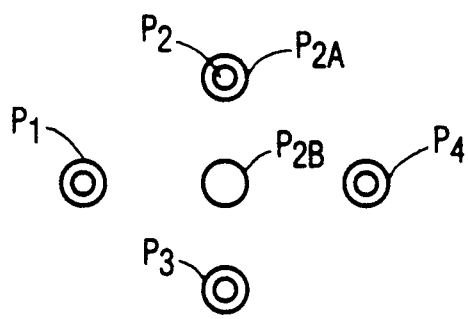
FIG. 2 is a pixel diagram illustrating pixels for interpolation in accordance with the invention.

Pixels $P_{2A}$ and $P_{2B}$ in FIG. 2 represent the pixels of the progressive output signal which are to be determined in each case. The luminance and chrominance value of pixel $P_{2B}$ is obtained by means of two median filterings from the corresponding values of the two vertically adjacent pixels ($P_2$, $P_3$) and the two temporally adjacent pixels ($P_1$, $P_4$) of the interlace input signal. The value of pixel $P_{2A}$ is transferred unchanged from pixel $P_2$. The value for $P_{2B}$ is determined in accordance with the following formula:

$$P_{2B} = \text{median } \{P_2, P_3, \text{median } [P_1, (P_2+P_3)/2, P_4]\}.$$

With a static image content ($P_1 = P_4$), the value for $P_{2B}$ is initially equal to $P_1$ or, respectively, $P_4$ due to the first temporal median filtering. Although the second vertical median filtering suppresses the theoretically highest vertical frequency which can be transmitted in the frame (frame lines alternately white-black-white), this image content does not occur in practice and would also lead to strong interline flickering in the case of a normal interlace display. It is much more important that vertical image signal amplitude steps are reproduced with full sharpness and that at the same time, nevertheless, no 25 Hz interline flickering occurs on horizontal edges.

With a dynamic image content, the temporal resolution is slightly reduced by the first median filtering. However, should the value for $P_{2B}$ initially determined deviate too much from the vertically adjacent image content, it is automatically corrected by the second median filtering (post test).

Figure 3:
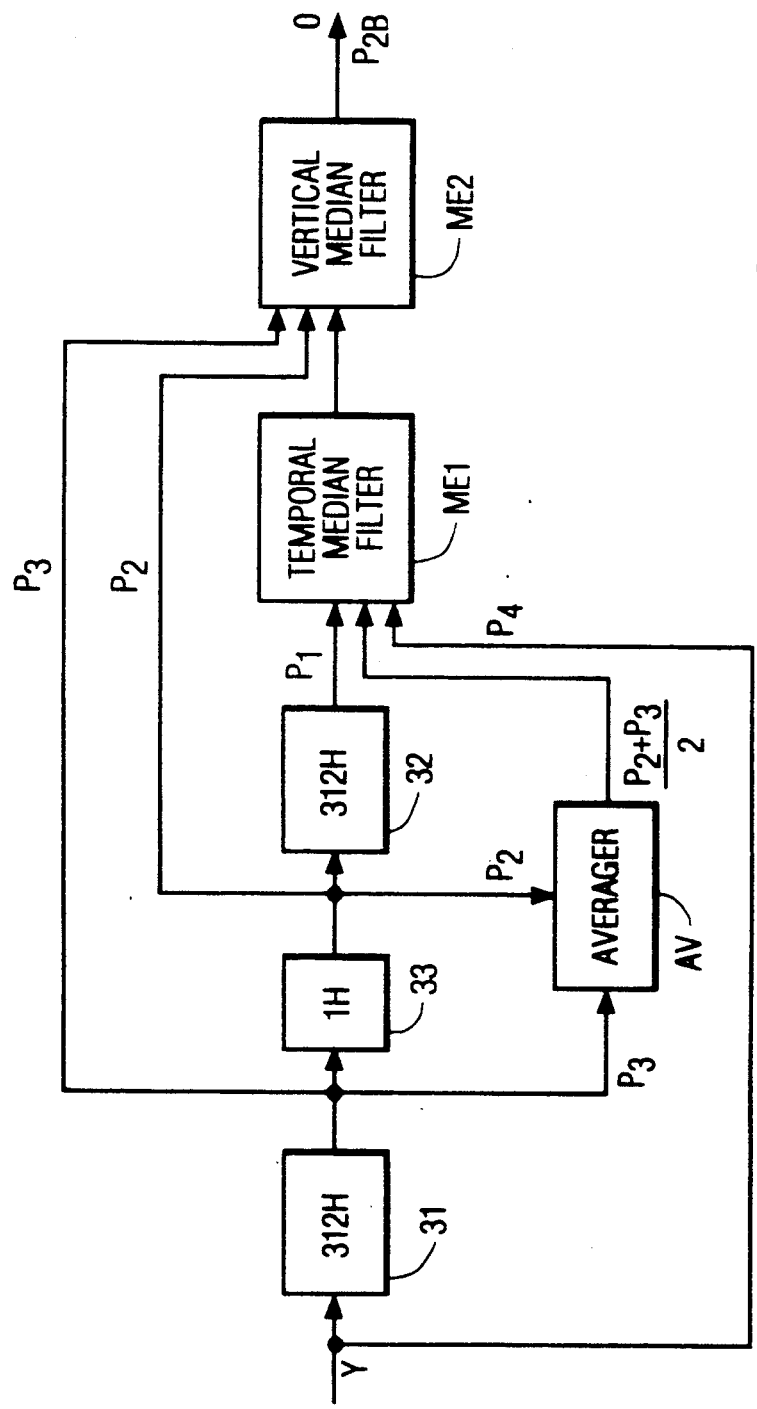
FIG. 3 is a block diagram illustrating a double median filter interpolation processor according to the invention.

In FIG. 3, interlace pixels $P_4$ are supplied at the input Y to a first 312-line buffer (field buffer) 31 and to a first median filter ME1, which also receives the output signal $P_1$ of a second 312-line buffer 32 and the output signal $(P_2+P_3)/2$ of an averaging circuit AV. The output signal $P_3$ of the field buffer 31 is supplied to a line buffer 33, to one input of the averaging circuit AV and to a second median filter ME2. The output signal $P_2$ of the line buffer 33 passes to the input of the second 312-line buffer 32, to the other input of the average circuit AV and to the second median filter ME2 which is also fed with the output signal of the first median filter ME1. At output O, the values $P_{2B}$ for the pixels of the progressive output signal can be picked up.

The values for the chrominance pixels can be obtained either by corresponding double median filtering or by vertical averaging (averaging circuit AV) in the field with the aid of a line buffer (33) with the appropriate temporal adaptation to the luminance: $P_{2A}=P_2$, $P_{2B}=(P_2+P_3)/2$.

Figure 4:
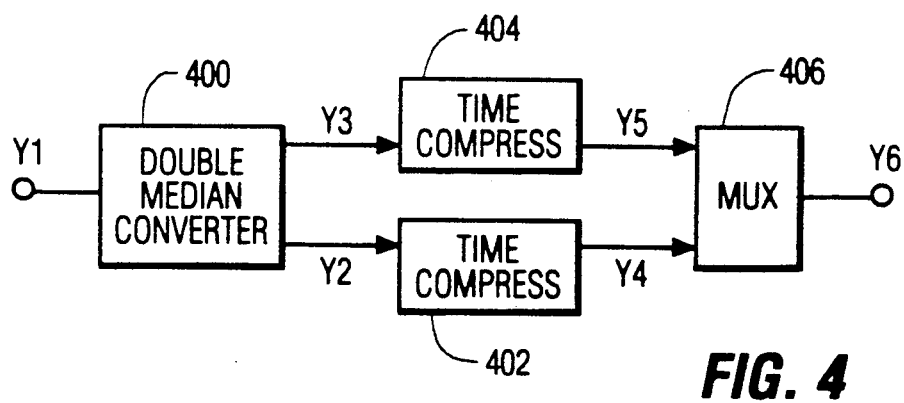
FIG. 4 is a block diagram illustrating application of the double median processor of FIG. 3 for luminance signal processing in a progressive scan processor.

FIG. 4 illustrates use of the double median processor of FIG. 3 in a progressive scan system. A luminance input signal Y1 is applied to the input of a double median processor 400 which outputs a video signal Y2 processed by double median filtering as previously described and a field delayed luminance signal Y3 (e.g., delayed by delays 31 and 33). The delayed Y3 and interpolated Y2 signals are time compressed by a factor of 2:1 by respective time compressors 404 and 402 and applied to a multiplex switch 406 which interleaves the time compressed lines of signals Y4 and Y5 to form the progressive scan output signal Y6 in which every other line corresponds to the delayed input signal and the in-between lines are interpolated by double median filtering.

Figure 5:
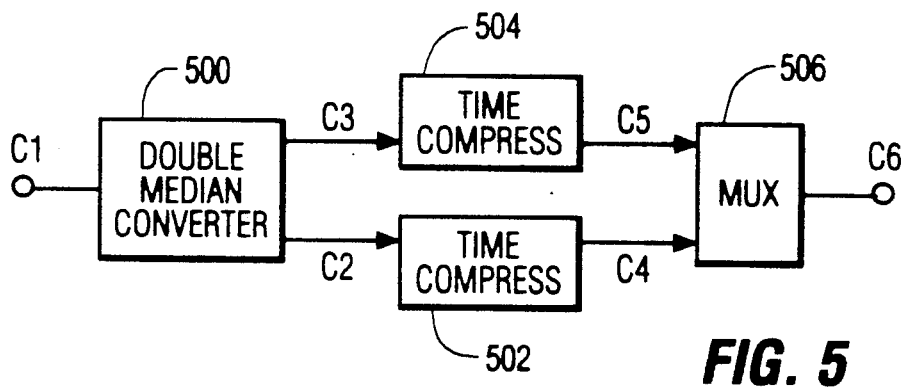
FIG. 5 is a block diagram illustrating application of the double median processor of FIG. 3 for chrominance processing in a progressive scan processor.

As noted above, the chrominance signal C1 may be processed by double median filtering also and this is shown in FIG. 5 in which the chrominance signal C1 is applied to a double median filter 500 (as per FIG. 3) to generate a field delayed chrominance signal C3 and a double median filtered interpolated chrominance signal C2. These signals are time compressed in respective time compressors 504 and 502 and the speeded-up signals C4 and C5 and interleaved by a multiplex switch 506 to generate the progressive scan chrominance output signal C6. As before, every other line of this signal corresponds to the input chrominance signal (delayed by a field to align with the luminance signal) and the in-between lines correspond to the chrominance signal interpolated by double median filtering.

Figure 6:
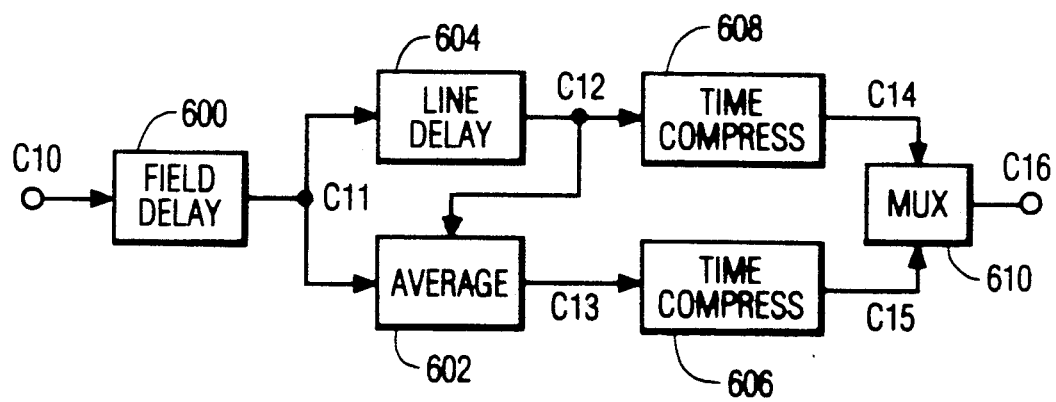
FIG. 6 is a block diagram illustrating a vertical averaging chrominance progressive scan processor suitable for use with the double median luminance progressive scan processor of FIG. 4 in a progressive scan conversion system.

An advantage of using double median filter processing of both the luminance and chrominance components in a progressive scan system is that the color detail is of very high quality. However, since detail is conveyed mainly by the luminance signal one may simplify the progressive scan system by applying double median filtering to the luminance signal (as per FIG. 4) and by applying vertical averaging to the chrominance signal. A suitable chrominance signal processor using vertical averaging and having a proper temporal response to align with the double median filtered luminance signal is shown in FIG. 6. There, a chrominance signal C10 is delayed by a field delay 600 and applied to a line delay 604 and to an averager 602 which receives at its other input the line delayed signal C12. The outputs of the line delay and the averager are applied to respective time compressors 608 and 606 and the compressed signals are interleaved to form a progressive scan video output signal by means of multiplex switch 610.

The invention can be used, for example for the PAL, SECAM, NTSC, (D2)MAC, HDMAC and MUSE television standards with corresponding numbers of lines in television standards with corresponding numbers of lines in television receivers and video recorders. The said numerical values are then changed as appropriate.

What is claimed is:

1. A method for interpolating a video input signal, comprising the steps of:
   forming a vertically interpolated signal from said video input signal;
   applying said vertically interpolated signal, a field delayed signal and a field advanced signal to respective inputs of a first median filter for forming a first median filtered signal; and
   applying said first median filtered signal, a line delayed signal and a line advanced signal to respective inputs of a second median filter for producing an interpolated video output signal subjected to double median filtering.

2. A method for interpolating a video input signal, comprising:
   forming interpolated pixel values by subjecting said video input signal to a temporal median filtering and to a vertical median filtering;
   selecting as inputs for said temporal median filtering input video signal pixels having the same spatial position and which are temporally adjacent to a pixel to be interpolated and a mean value from input pixels that are vertically adjacent to the pixel to be interpolated to provide a first temporal median filtered video output signal; and
   selecting as inputs for said vertical median filtering said vertically adjacent pixels and said temporally median filtered video signal for forming a video output signal interpolated by double median filtering.

3. A method according to claim 2 further comprising the steps of:
   time compressing said video input and output signals and interleaving the compressed signals to produce a progressive scan output signal.

4. A method according to claim 2 further comprising the step of selecting a chrominance signal as said video input signal.

5. A method according to claim 2 further comprising the step of selecting a luminance signal as said video input signal.

6. A method according to claim 3 wherein said video input signal comprises a luminance signal, said method further comprising the steps of time compressing said input and output signals; interleaving the compressed signals to form a luminance progressive scan output signal; providing a chrominance input signal, vertically interpolating said chrominance signal, time compressing and interleaving said chrominance input signal and said vertically interpolated chrominance signal to form a chrominance progressive scan output signal for display along with said luminance progressive scan output signal.

7. A method according to claim 3 wherein said video input signal comprises a luminance component of an interlaced video signal having also a chrominance component and further comprising the step of obtaining chrominance pixels for the progressive output signal by averaging of the chrominance pixel values vertically adjacent in the field, in conjunction with a temporal adaptional to the luminance.

8. A method according to claim 2 characterized in that for progressive scan conversion, the original pixel values of the corresponding interlace pixels are used for the pixel values of the progressive output signal in each second line.

9. An interpolator, comprising:
an input from which interlace pixels are supplied to a first field buffer and to a first median filter, which also receives the output signal of a second field buffer and the output signal of an averaging circuit, the output signal of the first field buffer being supplied to a line buffer, to the first input of the averaging circuit and to a second median filter, and the output signal of the line buffer passing to the input of the second field buffer, to a second input of the averaging circuit and to the second filter which is also fed with the output signal of the first median filter, the values for the pixels of the progressive output signal being taken at the output of the second median filter.

10. A device according to claim 9, characterized in that chrominance interlace pixels are supplied to a line buffer and to the first input of an averaging circuit in conjunction with a temporal adaptation to the luminance, the output of the line buffer being connected to a second input of the averaging circuit and the values for the chrominance pixels of the progressive output signal being taken at the output of the averaging circuit.

11. Apparatus for interpolating a video input signal, comprising:
first means for forming a vertically interpolated signal from said video input signal;
second means for applying said vertically interpolated signal, a field delayed signal and a field advanced signal to respective inputs of a first median filter for forming a first median filtered signal; and
third means for applying said first median filtered signal, a line delayed signal and a line advanced signal to respective inputs of a second median filter for producing a double median filtered video output signal.

12. Apparatus as recited in claim 11 further comprising:
means for field delaying said video input signal;
a time compression circuit for time compressing said double median filtered video output signal and for time compressing said field delayed video input signal; and
switching means for interleaving said time compressed signals for forming a progressive scan output signal.

* * * * *